United States Patent [19]
Turner

[11] Patent Number: 6,105,987
[45] Date of Patent: Aug. 22, 2000

[54] VALVE MECHANISM FOR DAMPING SYSTEM

[75] Inventor: Paul H. Turner, Boulder, Colo.

[73] Assignee: RockShox, Inc., San Jose, Calif.

[21] Appl. No.: 09/015,471

[22] Filed: Jan. 29, 1998

Related U.S. Application Data

[60] Provisional application No. 60/069,861, Dec. 17, 1997.

[51] Int. Cl.$^7$ .................................................. B62K 25/08
[52] U.S. Cl. ........................................... 280/276; 280/279
[58] Field of Search ................................... 280/276, 279, 280/283; 188/275, 319

[56] References Cited

U.S. PATENT DOCUMENTS

| | | |
|---|---|---|
| 2,329,803 | 9/1943 | Whisler . |
| 2,774,448 | 12/1956 | Hultin . |
| 3,338,347 | 8/1967 | Avner . |
| 3,414,092 | 12/1968 | Speckhart . |
| 4,254,849 | 3/1981 | Pohlenz .................................. 188/275 |
| 4,807,860 | 2/1989 | Simons .................................. 280/276 |
| 4,917,222 | 4/1990 | Bacardit . |
| 5,277,283 | 1/1994 | Yamaoka . |
| 5,285,875 | 2/1994 | Munoz . |
| 5,332,068 | 7/1994 | Richardson et al. . |
| 5,462,140 | 10/1995 | Cazort et al. . |
| 5,509,674 | 4/1996 | Browning .............................. 280/276 |
| 5,509,675 | 4/1996 | Barnett .................................. 280/276 |
| 5,598,903 | 2/1997 | Richardson . |
| 5,634,653 | 6/1997 | Browning .............................. 280/276 |
| 5,829,773 | 11/1998 | Rajaee ..................................... 280/276 |
| 5,848,675 | 12/1998 | Gonzalez ................................ 280/276 |
| 5,954,167 | 9/1999 | Richardson ............................. 188/275 |

FOREIGN PATENT DOCUMENTS

| | | |
|---|---|---|
| 294846 | 9/1966 | Australia . |
| 1125267 | 10/1956 | France . |
| 3544474 | 6/1987 | Germany . |
| 9627091 | 9/1996 | WIPO . |

*Primary Examiner*—J. J. Swann
*Assistant Examiner*—Michael Cuff
*Attorney, Agent, or Firm*—Skadden Arps Slate Meagher & Flom LLP; David W. Hansen

[57] ABSTRACT

A suspension system, particularly for a pedal-driven vehicle, comprising a telescoping strut having first and second telescopingly and coaxially engaged members, and having a damping system comprising a damping fluid, a damping piston connected to a piston rod, an inertia-activated compression fluid flow control mechanism and a pressure-activated compression fluid flow control mechanism disposed in the first telescoping strut. The inertia-activated compression fluid flow control mechanism comprises a valve body biased by a valve spring into a first position over a radial groove formed on the piston so that the valve body prevents fluid flow through an inertia-activated compression fluid flow circuit in response to force inputs imparted to the vehicle frame. The valve spring and valve body are connected to the piston rod which extends into the first telescoping member and is attached to the vehicle wheel, such that the valve body may be moved into a second position permitting fluid flow through the inertia-activated compression fluid flow circuit by force inputs imparted to the vehicle wheel. Because the inertia-activated fluid flow control mechanism is inertia-activated and not pressure-activated, a force impact imparted to the vehicle wheel results an fluid flow through both the pressure-activated and inertia-activated flow circuits, whereas force inputs such as from pedalling, weight shifting and acceleration or deceleration forces do not result in flow through the inertia-activated circuit. The suspension system therefore resists the absorption of pedal drive energy, provides a ride-leveling effect, and provides a broad range over which the damping system may be adjusted.

10 Claims, 4 Drawing Sheets

VALVE MECHANISM FOR DAMPING SYSTEM

This application claims benefit to U.S. Provisional application 60/069,861 filed Dec. 17, 1997.

BACKGROUND OF THE INVENTION

The present invention relates to the design and construction of a valve mechanism for controlling fluid flow through the damping system of a suspension system. More particularly, the present invention relates to damping system having an inertia-activated compression fluid flow control mechanism in combination with a pressure-activated compression fluid flow control mechanism for use in the suspension system of a vehicle, and particularly for use in a suspension system for a pedal-driven vehicle.

Suspension systems are used for various applications, such as for cushioning impacts, vibrations, or other disturbances experienced in the operation of vehicles and machinery. A telescoping suspension system typically has at least one telescoping strut comprising two telescoping members maintained in a biased-apart, neutral configuration. The telescoping members are telescopingly and coaxially engaged, and move together when the system is compressed in response to a force input and apart when the system rebounds or expands after compression. A common application of a suspension system is in bicycles and motorcycles for cushioning impacts or vibrations experienced by the rider when the bicycle or motorcycle is ridden over bumps, ruts, rocks, pot holes, or other obstacles.

Damping systems have been provided in suspension systems in order to absorb at least a portion of the energy imparted to the system as a result of impacts, vibrations, or other disturbances, as well as to provide desirable speed-sensitive or force-sensitive qualities to the suspension system. The design of such damping systems depends upon several factors. In bicycles, for example, the degree of damping to be achieved depends on several variables including the speed of the bicycle, the terrain over which the bicycle is being ridden, the structure of the bicycle, the wheel width, and the weight of the rider.

A particular concern in the design of damping systems for vehicles, and especially for pedal-driven vehicles such as bicycles, is the effect of the damping system on force inputs such as pedal force inputs. In bicycles, for example, riders frequently pedal while standing out of the saddle (rather than sitting), using their weight in addition to muscle force to propel the bicycle. This technique is particularly useful, for example, for accelerating quickly and for negotiating inclines. During out-of-saddle pedalling, however, a bicycle having a suspension system tends to bob down and up as the pedals are forced down and up by the rider's pedalling efforts and accompanying weight shift. This bobbing effect is exacerbated by a supple or soft suspension system, and may occur, in a pedal-driven vehicle having a very soft suspension, even when the rider is pedalling sitting down. The result is that an often significant portion of the energy being imparted to the bicycle by the rider to propel it forward is instead being absorbed by the damping system of the suspension.

Accordingly, there is a need for a suspension system for vehicles, and particularly for pedal-driven vehicles such bicycles, that resists the absorption of energy imparted to the system as a result of, for example, pedalling out of the saddle, yet permits adequate shock absorption in all regimes in which such vehicles are used.

SUMMARY OF THE INVENTION

The foregoing object of the invention is accomplished by the suspension system of the present invention. The suspension system of the present invention comprises at least one telescoping strut having first and second telescoping members that are telescopingly and coaxially engaged with each other, so that relative movement of the first and second telescoping members toward each other results in compression of the strut, and movement of the first and second telescoping members away from each other results in expansion of the strut. Within the strut, or external to the strut, a spring assembly is positioned between the first telescoping member and the second telescoping member to nominally bias the two telescoping members into a spaced-apart, expanded configuration.

A damping system is positioned within one or both telescoping members of the telescoping strut. In the preferred embodiment of the present invention, a common grade of hydraulic fluid is used for damping fluid in the damping system. However, it will be appreciated that a variety of fluids such as fish oil, glycerine or water, or a combination thereof, may be used instead. In addition, the damping system comprises an inertia-activated compression fluid flow control mechanism.

Preferably, the inertia-activated compression fluid flow control mechanism is connected to one of the telescoping members such that it is activated and permits fluid flow in response to force inputs imparted to that telescoping member, yet generally is not activated and does not permit fluid flow in response to force inputs imparted to the other telescoping member. For example, when the inertia-activated fluid flow control mechanism is used in a pedal-driven vehicle such as a bicycle, in which the second telescoping member would be configured for connection to a bicycle wheel and the first telescoping member would be configured for connection to a bicycle frame, the inertia-activated mechanism may be tuned to prevent fluid flow in response to pedal force inputs imparted to the first telescoping member.

The damping system of the present invention further comprises a compression fluid flow path and a rebound fluid flow path. The compression fluid flow path has an inertia-activated compression fluid flow circuit, the flow of damping fluid through which is regulated by the inertia-activated compression fluid flow control mechanism. The compression fluid flow path also may have a pressure-activated fluid flow circuit, the flow of damping fluid through which is regulated by a pressure-activated compression fluid flow control mechanism.

Preferably, the inertia-activated compression fluid flow control mechanism comprises a valve body and a valve spring. The valve spring biases the valve body into a first position in which the valve body substantially prevents the damping fluid from flowing through the inertia-activated compression fluid flow circuit, but permits the valve body to move, in response to a force input to the telescoping member to which the valve body is connected, to a second position in which the damping fluid is able to flow through the inertia-activated compression fluid flow circuit.

The damping system may include a piston having one or more axial ports therethrough, a radial groove formed on one end thereof, and one or more radial ports connecting the axial port to the groove. The valve body may be configured for engagement with the piston, such that the valve spring nominally biases the valve collar into a substantially sealing position over the groove of the piston. The inertia-activated compression fluid flow circuit then may extend from the axial piston port, through the radial piston port, to the groove. In this configuration, the first position of the valve collar is such that the valve body substantially blocks the radial piston port and thereby substantially prevents damping fluid from flowing through the inertia-activated compression fluid flow circuit.

In a preferred arrangement, the valve collar, valve spring, damping fluid and piston of the damping system are disposed within the first telescoping member. A piston rod, of which the second telescoping member is exclusively or partially comprised, extends into the first telescoping member and mounts to the piston, and includes a spring mounting shoulder for interconnecting the valve collar to the piston rod by way of the valve spring. Thus, a force impact imparted to the second telescoping member results in damping as the piston slidably moves through the damping fluid within the first telescoping member, and may result in compression of the valve spring, disengagement of the valve collar and piston, and in fluid flow through the inertia-activated compression fluid flow circuit, resulting in an increased fluid flow along the compression fluid flow path of the damping system.

The pressure-activated compression fluid flow control mechanism preferably comprises one or more shims positioned adjacent an end of the piston, such that compressive fluid flow through the pressure-activated compression fluid flow circuit is blocked unless pressure builds sufficiently to displace the shim from its first position.

In addition, the compression fluid flow path may also include a bleed circuit, preferably a bi-directional bleed circuit that it shares with the rebound fluid flow path. The bleed circuit may comprise a bleed flow adjuster for adjusting compression and/or rebound flow through the bleed circuit.

The damping system of the present invention may be used in motorcycles, ATV's and in other vehicles, but is particularly suited for use in pedal-driven vehicles such as bicycles, as it is able to reduce or eliminate the absorption of pedal-drive energy. The use of the present invention has also been found to have two additional, unexpected advantages: it provides a much wider compression damping adjustment range, and thus much less deterioration to ride quality, than is provided by traditional damper valves; and it creates a ride-leveling effect such that, although the damping system may be tuned to be highly responsive to all or some range of small/slow and large/rapid bumps and impacts imparted to the wheels of the vehicle, the system may at the same time be tuned to remain firm in response to accelerations, decelerations, weight shifting, and other force inputs imparted to the body of the vehicle.

The features and advantages of the present invention will be readily apparent from the following detailed description of the preferred embodiment, which makes reference to the several figures of the drawings wherein like reference characters represent like elements, the scope of the invention being set out in the appended claims.

DETAILED DESCRIPTION OF THE INVENTION

Figure 1:
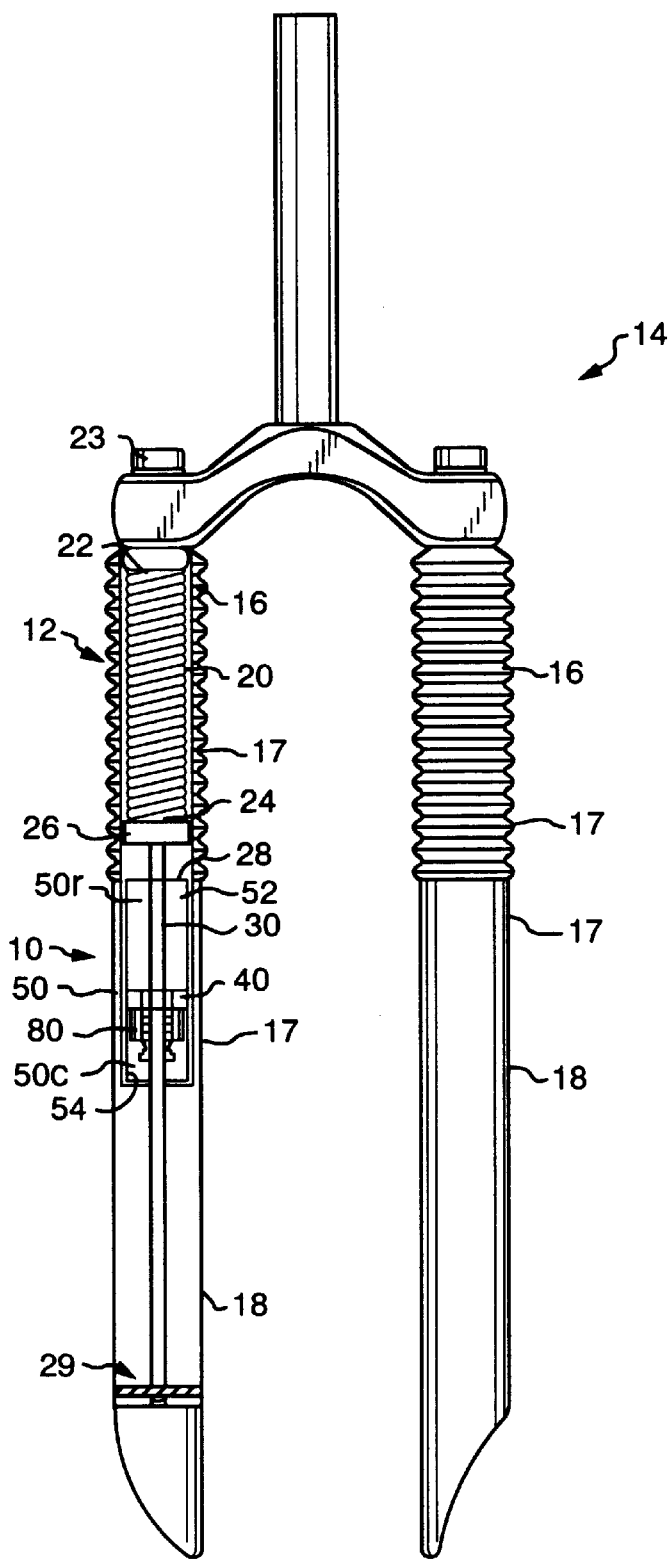
FIG. 1 is a perspective and partial sectional view of a bicycle suspension fork having the damping system of the present invention positioned therein.

Referring to FIG. 1, damping system 10 is shown provided in a bicycle suspension fork 14, for use with a bicycle suspension system, although it will be appreciated that damping system 10 may be used in any pedal-driven or other vehicle having a suspension system which would benefit from such damping. For example, damping system 10 may be used in a motorcycle or ATV. However, for the sake of simplicity, reference hereinafter will only be made to the use of the damping system of the present invention in a bicycle suspension system, even though other applications are contemplated.

As is typical for bicycle suspension forks, bicycle suspension fork 14 typically has a pair of first telescoping members 16 each slidably engaged with a respective one of a pair of second telescoping members 18. Preferably, each first telescoping member 16 telescopingly engages its respective second telescoping member 18 such that each pair of engaged telescoping members 16, 18 constitutes a telescoping strut 17, 19. As shown in FIG. 1, each telescoping strut 17, 19 has a first telescoping member 16 which telescopically slides within a second telescoping member 18 such that first telescoping member 16 is an inner tubular member and second telescoping member 18 is an outer tubular member. However, it will be appreciated that the struts 17, 19 can be designed so that the second telescoping member is the inner sliding tube which slidably engages the inner surface of the first telescoping member which is thus considered an outer sliding tube.

Telescoping struts 17 and 19 are connected to a steerer tube 4 by means of a fork crown 6. Steerer tube 4 is configured for mounting bicycle suspension fork 14 to a bicycle frame. Second telescoping members 18 of telescoping struts 17, 19 each have a dropout portion 8 configured to connect a bicycle wheel to bicycle suspension fork 14. In addition, struts 17 and 19 of bicycle suspension fork 14 preferably are connected by a fork cross member 9 that may be used to provide structural stability to suspension system 12, to hold a brake cable in position relative to fork 14, or to achieve other objectives.

A suspension system 12, comprising a spring assembly 20 including one or more spring elements (such as the coil spring shown in FIG. 1 or an air spring, an elastomer spring, or any other spring known in the art for providing the desired suspension), is provided within the telescoping members 16, 18 of at least one of telescoping struts 17, 19 to bias telescoping members 16, 18 apart into a neutral, spaced-apart state or configuration. It will be appreciated that in some applications, spring assembly 20 may be configured to be disposed external to telescoping members 16, 18. This is a common configuration, for example, for bicycle rear shock absorbers.

Typically, spring assembly 20 is positioned within the first telescoping member 16. In the preferred embodiment, the top end 22 of spring assembly 20 is positioned against a stop element, preferably a cap 23 which may be removed to access the inside of first telescoping member 16, and the bottom end 24 of spring assembly 20 rests on flange 26 arranged at the top end 28 of piston rod 30. Flange 26 need not be formed as part of piston rod 30, but, instead, may be separately coupled thereto. During use, the suspension system permits compression of the telescoping members and subsequent rebound or expansion of the members. Energy stored by spring assembly 20 during compression is used to expand telescoping members 16, 18 during rebound.

Damping system 10 is provided in at least one of struts 17, 19 to damp suspension system 12 as desired or necessary through the use of piston rod 30, piston 40 having a valve assembly 46, and a damping fluid 52. Piston rod 30 is substantially coaxially arranged with, and preferably through, first and second telescoping members 16, 18 of suspension fork 14. As mentioned above, a flange 26 is preferably attached at the top end 28 of piston rod 30 to support the bottom end 24 of spring assembly 20 of suspension system 12. The bottom end 29 of piston rod 30 is fixedly coupled to second telescoping member 18 to move therewith.

Figure 2:
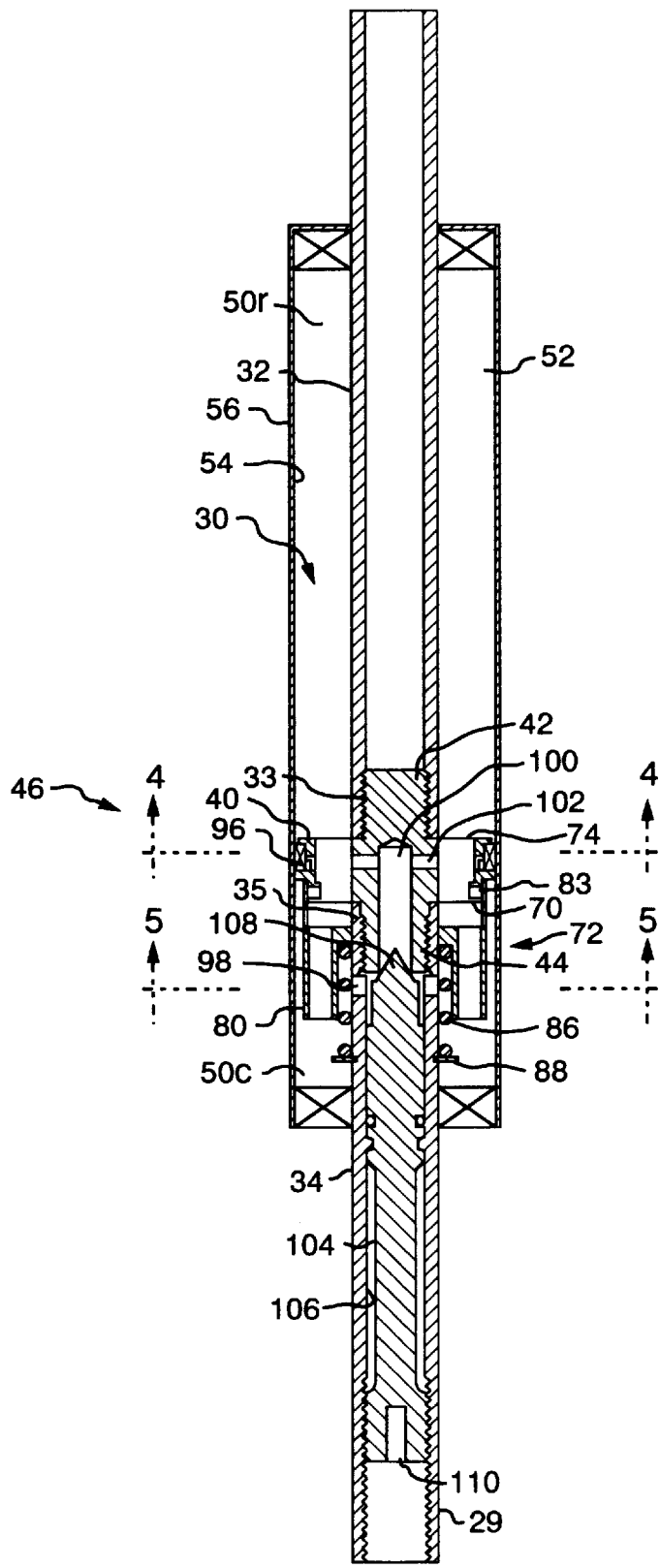
FIG. 2 is a side cross-sectional view of the damping system of the present invention, as incorporated into the bicycle suspension fork of FIG. 1.

Piston 40 is mounted on piston rod 30 for movement therewith. Although piston rod 30 may be a single-piece rod passed through piston 40, piston rod 30 preferably is a two-part rod comprising an upper piston rod 32 and a lower piston rod 34, preferably threadedly coupled together, as may be appreciated by reference to FIG. 2. As shown in FIG. 2, the coupled ends 33, 35 of upper and lower piston rods 32, 34, respectively, are internally threaded. Piston 40 has externally threaded coupling ends 42, 44 for coupling respectively to upper and lower piston rods 32, 34 by threadedly engaging ends 33, 35. Piston 40 and piston rod 30 are thereby coupled together.

Piston 40 is provided with a plurality of axially extending ports 74 therethrough, as may be seen with reference to FIGS. 2, 3, 4, and 6. Preferably, eight ports 74 are provided substantially equidistantly spaced from one another, as shown in the cross-sectional view of piston 40 in FIG. 4. Piston 40 is positioned within damping fluid chamber 50 for movement through damping fluid 52. In the preferred embodiment of the present invention, a common grade of hydraulic oil preferably having approximately SAE weight 5 is used for damping fluid 52 contained by the walls of chamber 50. However, it will be appreciated that a variety of fluids such as fish oil, glycerine, water, air, or nitrogen, or a combination thereof may be used instead. The ends of chamber 50 are sealed, as known in the art, to contain the damping fluid 52 therein with minimal leakage.

Although damping fluid 52 may be provided directly in first telescoping member 16 (such that the walls 54 of damping fluid chamber 50 are the walls of the first telescoping member 16), it is preferable to provide damping fluid 52 in a cartridge 56 such that the walls 54 of damping fluid chamber 50 are the walls of the cartridge 56. A preferred type of cartridge is that currently sold as the "C-3" cartridge by RockShox, Inc. of San Jose, Calif. Thus, the damping system 10 may be provided and removed as a self-contained unit, as shown in FIG. 2. Because cartridge 56 is typically smaller than the telescoping member in which it is placed, less damping fluid is used, thereby resulting in a lighter-weight damping system. It is of course possible to design the second telescoping member by including an appropriate lower sealing plate so as to create a chamber for a holding the damping fluid and in the same manner to provide an upper sealing plate to create a chamber for holding both the damping fluid and an air space above the damping fluid.

Damping of suspension system 12 is achieved as a result of the movement of piston 40 through the damping fluid 52, which results in the controlled flow of damping fluid 52 through damping ports (including ports through piston 40) and fluid control mechanisms forming a valve assembly 46 as follows. Piston 40 divides damping fluid chamber 50 in which it is positioned into two subchambers 50C and 50R. The volumes of subchambers 50C and 50R vary depending on the stage of compression or rebound and, thus, on the position of piston 40. Upon compression, because of the relative movement between first and second telescoping members 16, 18, piston 40 (fixed with respect to second telescoping member 18 as a result of the fixing of piston rod 30 to second telescoping member 18) slides within damping chamber 50 toward the top of chamber 50 (i.e., further into first telescoping member 16). The volume of subchamber 50C, and the volume of damping fluid 52 therein, thus increases during compression, whereas the volume of subchamber 50R, and of damping fluid 52 therein, decreases proportionally. Similarly, during rebound, piston 40 slides within damping chamber 50 toward the bottom of chamber 50 (moving in an outward direction from first telescoping member 16). The volume of subchamber 50R, and of damping fluid 52 therein, thus increases during rebound, whereas the volume of subchamber 50C, and damping fluid 52 therein, decreases proportionally.

Figure 3:
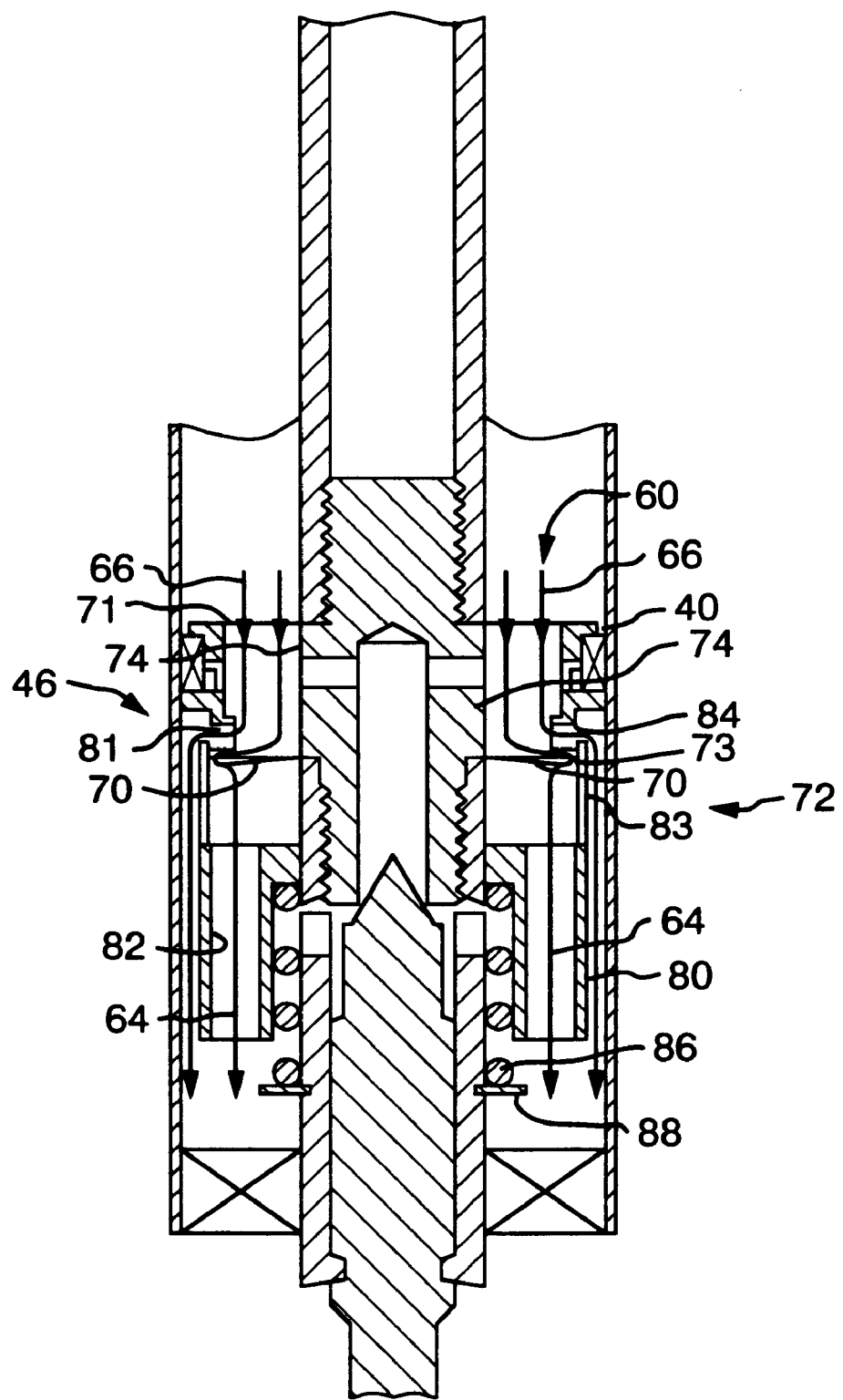
FIG. 3 is an enlarged side cross-sectional view of the piston and valve mechanism of FIGS. 1 and 2 and showing the valve collar of the damping system of the present invention displaced during compression of the suspension system.
Figure 4:
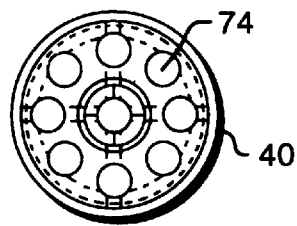
FIG. 4 is a view along line IV—IV of FIG. 2, showing a cross-section of the piston of the damping system of FIG. 2.
Figure 5:
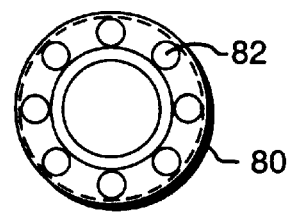
FIG. 5 is a view along line V—V of FIG. 2 showing a cross-section of the valve collar of the damping system of FIG. 2.
Figure 6:
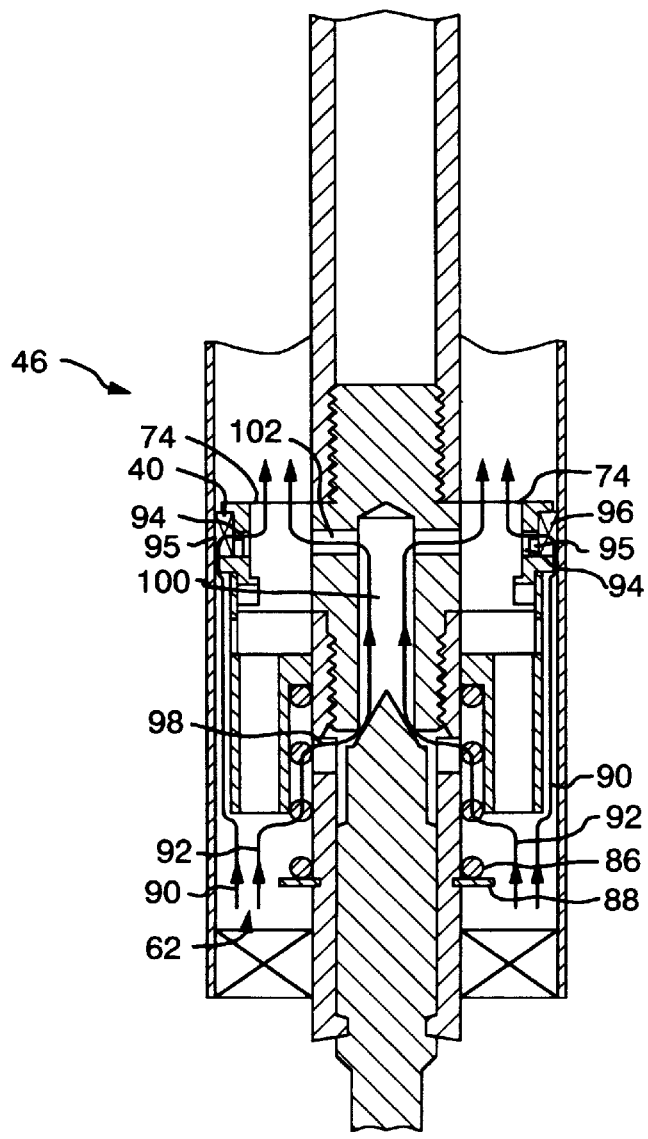
FIG. 6 is an enlarged side cross-sectional view of the piston and valve collar of FIGS. 1 and 2 with the valve collar in a non-displaced position relative to the piston during rebound of the suspension system.

In order to permit damping fluid 52 to flow between subchambers 50C and 50R, a compression fluid flow path 60 and a rebound fluid flow path 62 are provided across piston 40, as may be seen in FIGS. 3 and 6, and as described in further detail below. Because it is typically desirable to have compression flow characteristics that are independently adjustable from the rebound flow characteristics, the rebound and compression flow paths 60, 62 have independent primary flow control mechanisms.

Compression fluid flow path 60 comprises three compression fluid flow circuits 64, 66 and 67. Compression fluid flow circuit 67 is a bi-directional bleed or bypass circuit regulated by bleed flow adjuster 104. Generally, compression fluid flow circuits 64 and 66 are intended to regulate the flow of damping fluid 52 and compression fluid flow circuit 67 enables the fine adjustment of the operation of compression fluid flow circuits 64 and 66. Flow through bleed circuit 67 preferably is adjustable by varying the position of a bleed flow adjuster 104 relative to bleed valve inlet port 98. Bleed flow adjuster 104 is positioned within a longitudinally extending bore 106 in piston rod 34 and has a control end 108 positioned adjacent radial inlet ports 98 and shaped to vary flow through radial inlet ports 98. In the embodiment of FIG. 2, control end 108 is substantially conical such that withdrawal of control end 108 from radial inlet ports 98 gradually opens inlet ports 98. The position of bleed flow adjuster 104 within bore 106 may be adjusted by actuating adjustment end 110, which is accessible through bottom end 29 of piston rod 30. Preferably, adjustment end 110 and bottom end 29 are threadedly engaged such that rotation of adjustment end 110 causes bleed flow adjuster 104 to move with respect to piston rod 30.

Compression fluid flow circuit 64 is a pressure-activated or pressure-sensitive circuit regulated by pressure-activated compression fluid flow control mechanism 70. Preferably, pressure-activated compression fluid flow control mechanism 70 comprises an arrangement of one or more shims, shim/spring combinations or another type of restrictive element for regulating the size of outlet 73 to control the amount of fluid entering subchamber 50C. As will be appreciated by those having skill in the art, however, other pressure-activated valve arrangements may be used, including, for example, an unshimmed bleed circuit having restrictively sized ports. Once the pressure of damping fluid 52 has increased sufficiently during compression to deflect flow control mechanism 70 away from outlet 73 of piston 40, damping fluid 52 will flow from subchamber 50R, through inlet 71 and ports 74, and across flow control mechanism 70 through outlet 73 to subchamber 50C. The greater the pressure of damping fluid 52, the greater the deflection of flow control mechanism 70 (or of another flow regulating mechanism), and the greater the flow of damping fluid 52 into subchamber 50C.

Once damping fluid 52 has passed compression fluid flow control mechanism 70, it generally must flow through axially extending ports 82 of a valve body, which in the preferred embodiment, is configured as a valve collar 80. Under certain conditions discussed in more detail below, however, damping fluid 52 may also pass inertia-activated compression fluid flow control mechanism 79 and flow through inertia-activated compression fluid flow circuit 66. The flow of damping fluid 52 through fluid flow circuit 66 is regulated, and nominally blocked by, inertia-activated compression fluid flow control mechanism 79, which comprises valve collar 80. A first end 83 of valve collar 80 seats into a position over recess or groove 84 formed on piston 40 to cover one or more radial ports 85 through piston 40. Valve collar 80 is preferably formed from a heavy material, such as brass, and is normally biased into such a seating arrangement with piston 40 by a valve spring 86 supported on spring retainer 88, or another type of spring mounting shoulder formed on or attached to piston rod 30. In the preferred embodiment, valve spring 86 is a metal coil spring, but may alternatively be formed of an elastomer spring, an air spring, or any other type of spring with equal effect.

Inertia-activated compression fluid flow control mechanism 79, and thus valve collar 80, is substantially not pressure-sensitive. Specifically, although increases in the pressure of damping fluid 52 may deflect compression fluid flow control mechanism 70, such pressure increases generally will not be able to deflect valve collar 80, which is designed to be inertia-activated. As a result, activities such as, for example, pedalling out of the saddle, decelerating or weight shifting, may result in fluid flow through pressure-activated fluid flow circuit 64, but generally will not result in fluid flow through inertia-activated fluid flow circuit 66.

Inertia-activated compression fluid control mechanism 79 (valve collar 80 and valve spring 86) operates as follows. As previously described, valve collar 80 is nominally biased into contact with piston 40 by a valve spring 86 to cover ports 85 through piston 40. Valve spring 86 and valve collar 80 are mounted on, and valve collar 80 is slidable with respect to, piston rod 30. When piston rod 30 is forced upwards by a force input (such as when the bicycle hits a bump), the inertia of valve collar 80 causes valve collar 80 to compress valve spring 86 and inhibits valve collar 80 from moving in unison with piston rod 30. When this occurs, valve collar 80 and piston 40 disengage, and radial ports 85 through piston 40 are partially or fully uncovered so that fluid may flow through inertia-activated compression fluid flow circuit 66 as well as through pressure-activated compression fluid flow circuit 64. Under normal operating conditions, the combined flow of damping fluid 52 through flow circuits 64 and 66 will generally be greater than the flow through only flow circuit 64.

Preferably, the disengagement of piston 40 and valve collar 80 is short in duration, although the duration is adjustable as a function of, among other things, the spring constant of valve spring 86 (preferably about 30 grams/mm), the preload and preload force applied by valve spring 86 (preferably about 4 to 5 mm and about 120 to 150 grams, respectively), the weight of valve collar 80 (preferably about 15 to 20 grams), and the force input. In the preferred embodiments illustrated in FIGS. 1 through 6, the preload and preload force are 4 mm and 130 grams, respectively, and the valve collar weighs about 18 grams. Generally, the weight of valve collar 80 and the characteristics of valve spring 86 preferably are selected so that valve spring 86 is capable of applying enough force to hold valve collar 80 in place relative to piston 40, but is not so stiff as to prevent valve collar 80 from disengaging with respect to piston 40 when a predetermined impact force threshold is reached. In any event, valve collar 80 generally will reseat against piston 40 when the force exerted by valve spring 86 overcomes the inertia of valve collar 80, and the flow of damping fluid 52 will once again be controlled by pressure-activated compression fluid flow control mechanism 70.

After compression, as with other state of the art suspension systems, the suspension system 12 undergoes a rebound stroke during which first telescoping member 16 and second telescoping member 18 move apart. As a result, piston 40 slides downwardly through damping chamber 50 toward the bottom of chamber 50 (toward the bottom end of first telescoping member 16).

As the volume of subchamber 50C is reduced during rebound, fluid therein must flow into subchamber 50R. In order to permit the volume of damping fluid within subchambers 50C and 50R to vary as the volume of subchambers 50C, 50R varies during rebound, rebound damping fluid flows through rebound fluid flow path 62. During a rebound stroke, damping fluid 52 is substantially prevented from flowing across compression fluid flow control mechanism 70, which acts as a one-way valve. Moreover, valve collar 80 covers ports 85 in piston 40 so that rebound fluid flow also cannot pass into ports 74 around valve collar 80. Thus, rebound fluid flow is preferably substantially restricted to rebound flow path 62 comprising a first rebound fluid flow circuit 90 through piston 40 and a second rebound fluid flow circuit 92 formed through piston rod 30 (comprising rods 32, 34) and past piston 40.

Second rebound fluid flow circuit 92 in piston rod 30 and compression fluid flow circuit 67 comprise a single bi-directional bleed circuit 67, 92. Fluid flow through bi-directional bleed circuit 67, 92 extends from chamber 50C through one or more radial inlet ports 98 in piston rod 34, to axially extending port 100, one or more radially extending outlet ports 102 in piston rod 32, and ports 74 in piston 40 to chamber 50R, as shown in FIGS. 2 and 6. First rebound fluid flow circuit 90 is formed as follows. Piston 40 is provided with a circumferentially extending rebound flow groove 94 that intersects axially extending ports 74 through piston 40. A piston ring or glide ring 96 is positioned around piston 40 and movably within rebound flow groove 94 to selectively cover and uncover one or more rebound inlet flow ports 95. Glide ring 96 facilitates sliding and sealing of piston 40 against the inner walls of damping fluid chamber 50. Downward movement of piston 40 through damping fluid chamber 50 (i.e., during rebound), generally results glide ring 96 partially or completely uncovering inlet flow ports 95. Damping fluid thus passes through the portion of rebound flow groove 94 (forming inlet flow ports 95 through piston 40) no longer covered by glide ring 96, through ports 74 in piston 40, and out the open top ends of ports 74 (now forming an outlet for rebound flow path 64), as shown in FIG. 6. During compression, however, glide ring 96 remains over inlet flow ports 95 and substantially prevents flow therethrough.

Valve assembly 46 permits suspension system 12 to effectively insulate a rider from force inputs to the wheel of the bicycle, yet promptly returns suspension system 12 to its nominal, pressure-sensitive configuration so that other performance characteristics are not adversely affected. For example, inertia-activated compression fluid flow control mechanism 79 of the present invention is substantially not sensitive to pedal inputs, and therefore resists or prevents pedal drive energy absorption. It should be noted, however, that although generally not desirable, pressure-activated valve 70 may be tuned or configured such that pedal drive energy is absorbed as damping fluid 52 flows through pressure-sensitive compression fluid flow circuit 64. Thus, for the suspension system as a whole to resist absorbing pedal drive energy, both inertia-sensitive valve collar 80 and pressure-sensitive valve 70 must be configured and/or tuned to resist responding to pedal forces.

In addition, two unexpected benefits are realized by the above-described arrangement. First, the present invention provides a much wider compression damping adjustment range, and thus much less deterioration to the bicycle ride quality than provided by traditional damper valves. Traditional damper valve arrangements typically have a main valve operating in conjunction with a bleed or bypass valve. When the main valve is configured to allow large volumes of fluid to pass in compression, such as is often necessary in order to provide superior large-bump or high-speed impact compression performance, the relative amount of fluid allowed by the bleed valve is too insignificant to be of use in the small-bump or low-speed impact compression performance regime. However, when the main valve is configured so as to make the bleed valve effective (for example, by augmenting the shim stack regulating flow through the main valve or otherwise making the main valve sufficiently restrictive), insufficient flow passes through the main valve and bleed valve when large-bumps or high-speed impacts are encountered, resulting in an undesirably rigid suspension system.

In contrast, valve assembly 46 of the present invention generally enables the user to tune the suspension system for both the small-bump/low-speed impact and large-bump/high-speed impact compression regimes. This is because valve assembly 46 may be tuned, by adjusting the weight of valve collar 80 and valve spring 86, such that valve collar 80 will disengage from piston 40 when a large bump is encountered by the bicycle wheel attached to suspension fork 14, or when the wheel is subjected to a high-speed impact, but not under small bump or low-speed impact conditions. As a result, pressure-activated valve 70 may be tuned to provide ideal small-bump/slow-speed impact performance, and inertia-activated compression fluid flow control mechanism 79 may be tuned to provide ideal large-bump/high-speed impact performance. Thus, valve assembly 46 provides a broader range of exceptional compression damping performance and adjustment than has been achievable with traditional damper valves.

A second unexpected benefit realized through the use of damping system 10 of the present invention is a ride-leveling effect. Specifically, when the bicycle wheel connected to piston rod 30 is forced up from a large bump or high-speed impact, piston rod 30 moves piston 40 upward quicker than valve collar 80 moves upward, as described above. Thus, damping is soft and compliant and damping system 10 and spring assembly 20 absorb the impact, minimizing the effect of forces that would otherwise tend to raise the bicycle frame. However, when the bicycle frame is forced down, such as from pedalling forces, first telescoping member 16 is moved downward while second telescoping member 18 (as well as piston rod 30, piston 40, valve collar 80 and spring 86) remains fixed. Thus, the inertia-activated compression fluid flow circuit 66 generally remains in its inactivated or closed state, and suspension system 12 may be firmly damped by means of pressure-sensitive valve 70. A bicycle having damping system 10 with valve assembly 46 of the present invention is thus better stabilized than a bicycle having a traditional damping system.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, materials, and components and otherwise, used in the practice of the invention, which are particularly adapted to specific environments and operative requirements without departing from the principles of the present invention. For example, the damping system of the present invention may be used in a suspension fork having a single fork leg formed of telescopingly slidable tubes, instead of two fork legs, or may be applied to a rear bicycle shock absorber or a variety of other suspension systems. The presently disclosed embodiments are therefore to be considered in all respects as illustrative and not restrictive, the scope of the invention being indicated by the appended claims and their legal equivalents, and not limited to the foregoing description.

What is claimed is:

1. A suspension system for a pedal-driven vehicle, comprising:

a telescoping strut comprising a first telescoping member and a second telescoping member, said first and second telescoping members being telescopingly and coaxially engaged with each other, said telescoping strut being compressible by relative movement of said first and second telescoping members toward each other, and being expandable by relative movement of said first and second telescoping members away from each other;

a spring assembly positioned within said first telescoping member of said telescoping strut; and a damping system positioned within said telescoping strut, said damping system comprising a damping fluid and an inertia-activated compression fluid flow control mechanism;

said damping system further comprises a compression fluid flow path and a rebound fluid flow path;

said compression fluid flow path comprises an inertia-activated compression fluid flow circuit that is regulated by said inertia-activated compression fluid flow control mechanism;

said inertia-activated compression fluid flow control mechanism comprises a valve body and a valve spring;

said valve spring biases said valve body into a first position in which said valve body substantially prevents said damping fluid from flowing through said inertia-activated compression fluid flow circuit;

said valve body is movable against said valve spring to a second position in which said damping fluid is able to flow through said inertia-activated compression fluid flow circuit;

a piston having an axial piston port extending therethrough, said inertia-activated compression fluid flow circuit extending into said axial piston port;

said valve body having a first end and a second end, and said piston having a first end and a second end;

said first position of said valve body being such that said first end of said valve body is in engagement with said second end of said piston;

said second end of said piston has a radial piston port extending towards said first end of said valve body;

said inertia-activated compression fluid flow circuit further extends at least from said axial piston port, to said radial piston port; and said first position of said valve body being such that said first end of said valve body is seated in a position over said radial piston port and substantially blocks said radial piston port, thereby substantially preventing fluid flow through said inertia-activated compression fluid flow circuit.

2. A suspension system for a pedal-driven vehicle as in claim 1, wherein said damping system is positioned within said first telescoping member.

3. A suspension system for a pedal-driven vehicle as in claim 2, wherein said damping system is positioned within a cartridge disposed within said first telescoping member.

4. A suspension system for a pedal-driven vehicle as in claim 2, wherein:

said second telescoping member comprises a piston rod extending into said first telescoping member and having said piston mounted thereto; and a spring mounting shoulder is mounted to said piston rod, said valve spring of said inertia-activated compression fluid flow control mechanism being positioned on said piston rod between said first end of said valve body and said spring mounting shoulder.

5. A suspension system for a pedal-driven vehicle as in claim 4, wherein said valve body comprises a valve collar made of brass.

6. A suspension system for a pedal-driven vehicle as in claim 4, wherein said valve spring comprises a coil spring.

7. A suspension system for a pedal-driven vehicle as in claim 4, wherein said damping system further comprises a pressure-activated compression fluid flow control mechanism that regulates a pressure-activated compression fluid flow circuit.

8. A suspension system for a pedal-driven vehicle as in claim 4, wherein:

said pressure-activated compression fluid flow control mechanism comprises a shim positioned adjacent said second end of said piston;

said shim has a first position in which said shim substantially prevents said damping fluid from flowing through said pressure-activated compression fluid flow circuit; and said shim is movable to a second position in which said damping fluid is able to flow through said pressure-activated compression fluid flow circuit.

9. A suspension system for a pedal-driven vehicle as in claim 8, wherein said compression fluid flow path and said rebound fluid flow path comprise a bi-directional bleed circuit shared by both of said flow paths.

10. A suspension system for a pedal-driven vehicle as in claim 9, further comprising a bleed flow adjuster for adjusting said bi-directional bleed circuit.

* * * * *